US012305031B2

(12) United States Patent
Goldbach et al.

(10) Patent No.: US 12,305,031 B2
(45) Date of Patent: May 20, 2025

(54) PROCESS FOR MAKING A FLUOROPOLYMER DISPERSION

(71) Applicant: Arkema Inc., King of Prussia, PA (US)

(72) Inventors: James T. Goldbach, Paoli, PA (US); Anthony Bonnet, Saint Laurent de Mure (FR); Andrew P. Kahn, Eagleville, PA (US)

(73) Assignee: ARKEMA INC., King of Prussia, PA (US)

( * ) Notice: Subject to any disclaimer, the term of this patent is extended or adjusted under 35 U.S.C. 154(b) by 875 days.

(21) Appl. No.: 17/291,002

(22) PCT Filed: Nov. 6, 2019

(86) PCT No.: PCT/US2019/059979
§ 371 (c)(1),
(2) Date: May 4, 2021

(87) PCT Pub. No.: WO2020/101963
PCT Pub. Date: May 22, 2020

(65) Prior Publication Data
US 2022/0073721 A1    Mar. 10, 2022

Related U.S. Application Data

(60) Provisional application No. 62/758,831, filed on Nov. 12, 2018.

(51) Int. Cl.
*C08L 27/16*    (2006.01)

(52) U.S. Cl.
CPC ........... *C08L 27/16* (2013.01); *C08L 2201/52* (2013.01)

(58) Field of Classification Search
CPC .............................. C08L 27/16; C08L 2201/52
See application file for complete search history.

(56) References Cited

U.S. PATENT DOCUMENTS

| | | |
|---|---|---|
| 7,012,122 B2 | 3/2006 | Kappler et al. |
| 8,080,621 B2 | 12/2011 | Amin-Sanayei et al. |
| 8,124,699 B2 | 2/2012 | Durali et al. |
| 8,158,734 B2 | 4/2012 | Amin-Sanayei et al. |
| 8,338,518 B2 | 12/2012 | Amin-Sanayei et al. |
| 8,765,890 B2 | 7/2014 | Amin-Sanayei et al. |
| 9,068,071 B2 | 6/2015 | Amin-Sanayei et al. |
| 10,364,311 B2 | 7/2019 | Peng et al. |
| 2003/0060664 A1 | 3/2003 | Okahata et al. |
| 2004/0057906 A1 | 3/2004 | Hsu et al. |
| 2004/0192836 A1 | 9/2004 | Wille et al. |
| 2007/0082993 A1* | 4/2007 | Amin-Sanayei ...... C08F 214/22 524/386 |
| 2012/0116016 A1 | 5/2012 | Uschold |
| 2012/0116017 A1 | 5/2012 | Brothers et al. |
| 2013/0345381 A1 | 12/2013 | Amin-Sanayei et al. |
| 2015/0148481 A1 | 5/2015 | Brothers et al. |
| 2017/0342177 A1 | 11/2017 | Peng et al. |
| 2019/0284428 A1 | 9/2019 | Carella et al. |

FOREIGN PATENT DOCUMENTS

EP    2274345 B1 *    1/2017    ............ C08F 114/22

* cited by examiner

*Primary Examiner* — Robert D Harlan
(74) *Attorney, Agent, or Firm* — Joanne Rossi

(57) ABSTRACT

The invention relates to a process to produce a stable fluoropolymer latex using non-fluorinated surfactant with greater thermal stability. The polymerization is run at pressures greater than typically used. The resulting polymer exhibit improved melt color stability as compared to those produced under similar conditions at lower pressures.

19 Claims, No Drawings

PROCESS FOR MAKING A FLUOROPOLYMER DISPERSION

This application is a national stage application under 35 U.S.C. § 371 of PCT Application PCT/US2019/059979, filed Nov. 6, 2019; which claims benefit to U.S. Provisional Application 62/758,831, filed Nov. 12, 2018; said applications incorporated herein by reference.

FIELD OF THE INVENTION

The invention relates to a process for forming a high-solids latex, fluoropolymer dispersion using non-fluorinated surfactant with greater thermal stability (i.e. less yellowing). The polymerization is conducted at pressures greater than typically used with emulsifiers that contain segments of polyethylene glycol and/or polypropylene glycol and/or polytetramethylene glycol. This process can also be used when little or no surfactant is used.

BACKGROUND OF THE INVENTION

Emulsion polymerization is a preferred method for forming fluoropolymers, producing fluoropolymer particles with an average particle size in the range of 20 nm to 1000 nm, and a latex having a low viscosity of generally less than 10 cP, that is shear and storage stable and can be easily conveyed by pumping or other typical liquid process techniques.

It is generally understood, in the art of commercial fluoropolymers that a stabilizing additive must be used in order to obtain a stable dispersion of polymer particles in the liquid (aqueous) phase. Common additives, known as surfactants or emulsifiers, include ionic amphiphiles such as sodium lauryl sulfate (SLS), hexadecyl trimethylammonium bromide (CTAB); and non-ionic amphiphiles such as octaethylene glycol monododecyl ether, and polyethylene glycol octylphenyl ethers (such as TRITON X-100). These compounds act to stabilize the interface of the (fluoro)polymer particles and the water phase thereby reducing the strength of particle-particle interactions and gross, premature coagulation of the solid from the liquid phase. Emulsions made with these types of surfactants often show increased stability against coagulation due to mechanical shearing, and it is often possible to increase their solids concentration while maintaining very low viscosity, both of which allow for efficient and cost-effective commercial production of the fluoropolymer resins as well as their direct use in applications where a low-viscosity, aqueous dispersion of solid is required, such as the base material in high-performance architectural coatings.

Conversely, while these surfactants improve desirable properties of the fluoropolymer latexes, they have the undesired effect of interfering with the free-radical polymerization reaction by chain-transfer. This interference manifests itself as a reduction of kinetics of polymerization, reducing production throughput, as well as possibly incorporating some of the surfactant structure into the fluoro(co)polymer itself, which in turn can alter the physical properties of the final material in an undesirable fashion, such as imparting a yellow or brown color.

To combat these issues, those skilled in the art have widely utilized (per)fluorinated surfactants for fluoromonomer polymerizations that do not interfere with or participate in the fluoromonomer polymerization reaction. While this approach has been extremely effective, there have arisen significant concerns regarding the biological and environmental persistence these fluorosurfactants, as well as their toxicity. Therefore, it is highly desirable to discontinue their use. Recently, regulations eliminating the use of C8 and longer-chain perfluorinated surfactants have taken effect, and it could be expected that shorter-chain (per)fluorinated surfactants will be phased-out in the near future.

Stable fluoro-surfactant-free fluoropolymers have been produced, as described for example in U.S. Pat. Nos. 8,080,621; 8,124,699; 8,158,734; 8,338,518; 8,765,890; and 9,068,071. While solving the toxicity issues, the fluoropolymers produced with non-fluorinated surfactant can oxidize under heat aging, causing an undesired yellowing of the fluoropolymer.

SUMMARY OF THE INVENTION

Surprisingly, it has now been found that a stable, low viscosity, high-solids, aqueous fluoropolymer emulsion with improved thermal-color stability can be produced when the polymerization pressure is from greater than 800 psi up to 13000 psi, preferably from greater than 1000 psi up to 3000 psi, more preferably in the range of from 1100 psi and up to 2000 psi. Using a surfactant comprising a non-fluorinated non-ionic emulsifiers containing segments of at least one of polyethylene glycol (PEG), polypropylene glycol (PPG), polytetramethylene glycol (PTMG) or a combination thereof, with repeating units between 2 to 200, preferably between 3 to 100, and more preferably 5 to 50 The process is run with a solids level of at least 33.5 wt %, preferably greater than 34 wt %, preferably greater than 35 wt %, and more preferable at least 36%. It has been found that the polymerization can be run with a solids level of at least 37 wt %, or even at least 38 wt %. The surfactant can be added prior to initiation and/or after initiation of the polymerization reaction.

An advantage of the invention is that melt-processed plaques of the fluoropolymer produced exhibit improved thermal-color stability vs. relevant controls, a critical factor for many fluoro(co)polymer applications where melt-processing techniques such as extrusion and injection molding are used to generate final parts and products.

In some embodiments of the invention lower levels of initiator and or surfactant can be used as compared to the standard polymerization process using comparable solids and run time. The presence of surfactant and or initiator can negatively affect the color of the polymer. Using less surfactant and or initiator in the polymerization results in decreased surfactant and or initiator in the final product resulting in a whiter product (less yellowing).

In embodiments of the invention, the invention relates to a method of producing a thermally stable fluoropolymer emulsion composition comprising at least 33.5 weight percent of fluoropolymer preferably greater than 34 weight percent of fluoropolymer or greater than 35 weight percent of fluoropolymer wherein the polymerization process is run at a pressure of greater than 800, preferably greater 1000 psi, more preferable at least 1100 psi, preferably at least 1200 psi. In all cases, the process is fluorosurfactant free.

The level of fluoropolymer solids in the composition is from at least 33.5 to 50 weight percent, preferably from greater than 34 to 45 weight percent, more preferably from greater than 35 to 45 weight percent, and more preferably from 36 to 45 weight percent. The level of fluoropolymer solids in the latex could be greater than 37 weight percent.

In one embodiment, the stable fluoropolymer composition or emulsion formed can contain little or no surfactant, and have a high fluoropolymer solids content. The latex can be dried into a solid resin, in which little or no surfactant is present, without using an ion exchange, washing, or other added unit operation.

The stable fluoropolymer emulsion composition of the invention can be homopolymer or copolymer having at least 70 weight percent of vinylidene fluoride monomer units.

The stable fluoropolymer emulsion composition of the invention can further comprise from 100 ppm to 10,000 ppm of one or more initiators. Preferably the initiator comprises at least one persulfate.

In another embodiment, the stable fluoropolymer emulsion composition has a level of surfactant of zero.

One embodiment is a method for forming a stable fluoropolymer emulsion, comprising the steps of:
a) charging a reaction mixture to a reactor, said reaction mixture comprising one or more fluoromonomers, non-fluorinated surfactant, with stirring,
b) heating the reaction mixture to a temperature of at least 25° C., preferable at least 50° C., or at least 80° C.; but not greater than 145° C. and adding one or more initiators,
c) pressurizing the reactor to a pressure of greater than 800 psi, preferably greater than 1000 psi, more preferably at least 1100 psi.
d) continuous or intermittently feeding additional monomer and initiator, and optionally surfactant, until polymerization is completed.

Another embodiment of the invention relates to a fluoropolymer composition produced from the process of the invention which has improved thermal-color stability.

The fluoropolymer composition could optionally also contain dyes, colorants, impact modifiers, antioxidants, flame-retardants, ultraviolet stabilizers, flow aids, conductive additives such as metals, carbon black and carbon nanotubes, defoamers, crosslinkers, waxes, solvents, plasticizers, and anti-static agents.

Aspects of the Invention

Aspect 1. A process for forming a stable fluoropolymer emulsion, comprising polymerizing in a reactor, one or more fluoromonomers in an aqueous medium comprising initiator, optionally fluorine-free surfactant, and running the polymerization at a pressure of greater than 800 psi; and wherein the surfactant comprises a non-fluorinated non-ionic emulsifiers containing segments of at least one of polyethylene glycol (PEG), polypropylene glycol (PPG), polytetramethylene glycol (PTMG) or a combination thereof, with repeating units of each segment between 2 to 200, preferably between 3 to 100, and more preferably 5 to 50.

Aspect 2. The process of aspect 1, wherein the pressure during polymerization is greater than 1000 psi.

Aspect 3. The process of any one of aspect 1 or 2, wherein the pressure during polymerization is at least 1100 psi, preferably at least 1150 psi, more preferably at least 1200 psi.

Aspect 4. The process of aspect 1, wherein the pressure during polymerization is from greater than 1000 psi to 2500 psi.

Aspect 5. The process of aspect 4, wherein the pressure during polymerization is from at least 1100 psi to 2000 psi.

Aspect 6. The process of any one of aspects 1 to 5, wherein the surfactant comprises at least one surfactant selected from the group consisting of polyethylene glycol acrylate (PEGA), polyethylene glycol methacrylate (PEG-MA), dimethyl polyethylene glycol (DMPEG), polyethylene glycol butyl ether (PEGBE), polyethylene glycol (PEG), polyethylene glycol phenol oxide (Triton X-100), polypropylene glycol acrylate (PPGA), polypropylene glycol (PPG) polypropylene glycol acrylate (PPGA), polypropylene glycol methacrylate (PPG-MA), and polytetramethylene glycol (PTMG).

Aspect 7. The process of any one of aspects 1 to 5, wherein the surfactant comprising an emulsifiers of Formula 1:

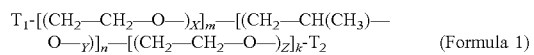
(Formula 1)

where X, Y, and Z are between 2 to 200; and m, n, k are from 0 to 5, wherein at least one of m, n and k are greater than 0 and $T_1$ and $T_2$ are terminal groups such as hydrogen, hydroxyl, carboxyl, ester, ether and/or hydrocarbon.

Aspect 8. The process of any one of claims 1 to 5, wherein the surfactant comprises a triblock copolymer, preferably having a PEG central block and PPG endblocks.

Aspect 9. The process of any one of aspects 1 to 8, wherein said non-fluorinated, non-ionic emulsifier(s) is present in the process at from 0 to 1 percent, preferably from 100 ppm to 1 percent, based on the weight of the fluoropolymer solids.

Aspect 10. The process of any one of aspects 1 to 5, wherein no surfactant is added during the polymerization.

Aspect 11. The process of any one of aspects 1 to 10, wherein the fluoromonomers are one or more fluoromonomers selected from the group consisting of vinylidene fluoride, tetrafluoroethylene, trifluoroethylene, chlorotrifluoroethylene, hexafluoropropene, vinyl fluoride, 1,1,1,3,3-pentafluoropropene, 3,3,3-trifluoro-1-(trifluoromethyl)prop-1-ene, 1,1,1,2-tetrafluoropropene, 1,1,1-trifluoropropene, 1,1,1,3-tetrafluoropropene, 1,1,1,2,3-pentafluoropropene, perfluoromethyl vinyl ether, perfluroethyl vinyl ether, and perfluoropropyl vinyl ether.

Aspect 12. The process of any one of aspects 1 to 11, wherein said fluoropolymer contains at least 50 mole percent vinylidene fluoride monomer units.

Aspect 13. The process of any one of aspects 1 to 12, wherein said fluoropolymer contains from 70 to 100 mole percent vinylidene fluoride monomer units and the level of one or more other fluoromonomers is from 0 to 30 mole percent.

Aspect 14. The process of any one of aspects 1 to 13, further comprising from 100 ppm to 10,000 ppm of one or more ionic or ionizable initiators.

Aspect 15. The process of any one of aspects 1 to 14, wherein said initiator(s) comprise at least one or more initiators selected from the group consisting of ammonium persulfate, alkali metal salts of persulfates, dialkyl peroxides, diacylperoxides, peroxyesters, and peroxydicarbonates, preferably ammonium or alkali metal salts of persulfate.

Aspect 16. The process of any one of aspects 1 to 15, wherein the solids level in the stable emulsion produced is at least 33.5 weight percent, preferably greater than 34 weight percent, preferably greater than 35 weight percent, preferably greater than 36 weight percent, more preferably greater than 37 weight percent, of fluoropolymer solids.

Aspect 17. The process of any one of aspects 1 to 16, wherein the solids level in the stable emulsion produced is at least 33.5 to 50 weight percent, or from greater than 34 to 45 weight percent solids, and more preferably from 35 to 45 weight percent, more preferably from 36 to 45 weight percent, more preferably from 37 to 45 weight percent, of fluoropolymer solids.

Aspect 18. The process of any one of aspects 1 to 17, wherein the surfactant is not added until after initiation of the polymerization reaction.

Aspect 19. The process of any one of aspects 1 to 17, wherein at least part of the surfactant is added prior to initiation of the polymerization reaction.

Aspect 20. The process of any one of aspects 1 to 19, wherein the YI of the polymer is 20 or less.

Aspect 21. A polymer produced from the process of any one of aspects 1 to 20.

Aspect 22. The polymer of aspects 21, further comprising at least one additive selected from the group consisting of dyes, colorants, impact modifiers, antioxidants, flame-retardants, ultraviolet stabilizers, flow aids, conductive additives such as metals, carbon black and carbon nanotubes, defoamers, crosslinkers, waxes, solvents, plasticizers, and antistatic agents.

DETAILED DESCRIPTION OF THE INVENTION

All references listed in this application are incorporated herein by reference. All percentages in a composition are weight percent, unless otherwise indicated, and all molecular weights are given as weight average molecular weight as determined by a GPC using PMMA as the standard, unless stated otherwise.

The term "polymer" is used to mean both homopolymers, copolymers and terpolymers (three or more monomer units), unless otherwise stated. Any copolymer or terpolymer can be random, blocky, or gradient, and the polymer can be linear, branched, star-shaped, comb-shaped or of any other morphology.

The term "stable" in reference to fluoropolymer latex compositions of the invention, means a latex that flows out of the reactor, can be poured and pumped without formation of coagulum, coagulum being defined as a material that will not pass through a 100 mesh screen. Such coagulum includes hard particles and wet masses of material (sometimes referred to as "blobs"). The stable fluoropolymer latex of the invention is one that will not visually settle after three months of storage, or if some settling occurs can be redispersed with gentle agitation. If coagulum forms on settling, the material would be considered as unstable. Coagulum recovered of greater than 6% is not sufficiently stable.

Fluoropolymer

The fluoropolymers of the invention include, but are not limited to polymers containing at least 50 weight percent of one or more fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride (VDF), tetrafluoroethylene (TFE), trifluoroethylene (TrFE), chlorotrifluoroethylene (CTFE), hexafluoropropene (HFP), vinyl fluoride (VF), 3,3,3-trifluoro-1-(trifluoromethyl)prop-1-ene (HFIB), perfluorobutylethylene (PFBE), pentafluoropropene, 3,3,3-trifluoro-1-propene, 2-trifluoromethyl-3,3,3-trifluoropropene, 1,1-dichloro-1,1-difluoroethylene, 1,2-dichloro-1,2-difluorethylene, 1,1,1,-trifluoropropene, 1,3,3,3-tetrafluoropropene, 2,3,3,3-tetrafluoropropene, 1-chloro-3,3,3-trifluoropropene, fluorinated or perfluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of C4 and higher, partially- or perfluorinated cyclic alkenes of C3 and higher, and combinations thereof. Fluoropolymers produced in the practice of the present invention include the products of polymerization of the fluoromonomers listed above, for example, the homopolymer made by polymerizing vinylidene fluoride (VDF) by itself.

Fluoro-terpolymers are also contemplated, including terpolymers such as those having tetrafluoroethylene, hexafluoropropene and vinylidene fluoride monomer units. Most preferably the fluoropolymer is a polyvinylidene fluoride (PVDF). The invention will be exemplified in terms of PVDF, but one of ordinary skill in the art will recognize that other fluoropolymers, including those comprising four or more fluoromonomers could be represented where the term PVDF is exemplified.

The polyvinylidene fluoride (PVDF) of the invention is PVDF homopolymer, copolymer or polymer alloy. Polyvinylidene fluoride polymers of the invention include the homopolymer made by polymerizing vinylidene fluoride (VDF), and copolymers, terpolymers and higher polymers of vinylidene fluoride, where the vinylidene fluoride units comprise greater than 51 percent by weight, preferably 70 percent of the total weight of all the monomer units in the polymer, and more preferably, comprise greater than 75 percent of the total weight of the monomer units. Copolymers, terpolymers and higher polymers (generally referred to herein as "copolymers") of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and 3,3,3-trifluoro-1-(trifluoromethyl)prop-1-ene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro (2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Preferred copolymers include those comprising from about 55 to about 99 weight percent VDF, and correspondingly from about 1 to about 45 weight percent HFP, and preferably a level of HFP of 2 to 30 weight percent; copolymers of VDF and CTFE; terpolymers of VDF/HFP/TFE; copolymers of VDF and TFE; and copolymers of VDF and 1,1,1,2-tetrafluoropropene.

In one embodiment of the invention, it is preferred that all monomer units be fluoromonomers, however, copolymer of fluoromonomers with non-fluoromonomers are also contemplated by the invention. In the case of a copolymer containing non-fluoromonomers, at least 60 percent by weight of the monomer units are fluoromonomers, preferably at least 70 weight percent, more preferably at least 80 weight percent, and most preferably at least 90 weight percent are fluoromonomers. Useful comonomers include, but are not limited to, ethylene, propylene, styrenics, acrylates, methacrylates, vinyl esters, vinyl ethers, non-fluorine-containing halogenated ethylenes, vinyl pyridines, and N-vinyl linear and cyclic amides.

Surfactant

Emulsifiers (surfactant) suitable for use in this invention are non-fluorinated non-ionic emulsifiers containing segments of polyethylene glycol (PEG), polypropylene glycol (PPG), polytetramethylene glycol (PTMG) or a combination thereof, with repeating units between 2 to 200, preferably between 3 to 100, and more preferably 5 to 50. The glycol-based emulsifiers used in this invention include, but are not limited to, polyethylene glycol acrylate (PEGA), polyethylene glycol methacrylate (PEG-MA), dimethyl polyethylene glycol (DMPEG), polyethylene glycol butyl ether (PEGBE), polyethylene glycol (PEG), polyethylene glycol phenol oxide (Triton X-100), polypropylene glycol acrylate (PPGA), polypropylene glycol (PPG) polypropylene glycol acrylate (PPGA), polypropylene glycol methacrylate (PPG-MA), and polytetramethylene glycol (PTMG).

Emulsifiers that contains blocks and having the following formula 1 are preferred in making light colored polymers which resist discoloration at normal temperatures for extrusion or other fabrication techniques.

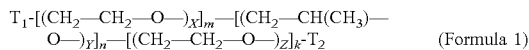

$$T_1\text{-}[(CH_2\text{---}CH_2\text{---}O\text{---})_X]_m\text{---}[(CH_2\text{---}CH(CH_3)\text{---}O\text{---})_Y]_n\text{---}[(CH_2\text{---}CH_2\text{---}O\text{---})_Z]_k\text{-}T_2 \quad \text{(Formula 1)}$$

where X, Y, and Z are between 2 to 200; and m, n, k are from 0 to 5. $T_1$ and $T_2$ are terminal groups such as hydrogen, hydroxyl, carboxyl, ester, ether and/or hydrocarbon.

One preferred block copolymer of the invention is a tri-block copolymer of formula 1 containing PEG and PPG blocks. These tri-block polymers may have a central block of either PEG or PPG, with the end blocks different than that of the central block. In one embodiment the PEG block(s) makes up less than 30 percent by weight of the triblock, preferably less than 20 weight percent, and most preferably less than 10 weight percent. One particularly preferred triblock copolymer is a triblock having a PEG central block and PPG endblocks.

The emulsifier may contain the same or different terminal groups on each end, such as hydroxyl, carboxylate, benzoate, sulfonic, phosphonic, acrylate, methacrylate, ether, hydrocarbon, phenol, functionalized phenol, ester, fatty ester, and the like. The terminal group can contain halogen atoms like Cl, Br and I, and also other groups or functions such as amine, amid, cycle hydrocarbon, and others. For example, polyethylene glycol acrylate with Mn about 375, polyethylene glycol with Mn about 570, polyethylene glycol methacrylate with Mn about 526, dimethyl polyethylene glycol with Mn about 250, polyethylene glycol butyl ether with Mn about 206, polyethylene glycol with Mn about 300, polypropylene glycol acrylate with Mn about 475, polypropylene glycol with Mn about 400, polypropylene glycol methacrylate (PPG-MA) with Mn about 375, and polytetramethylene glycol with Mn about 250 and polyethylene glycol with phenol oxide end group, and more specifically single, di, and triblocks of PEG, PPG, PTMG such as PPG-b-PEG-b-PPG (Pluronic 31R1 and 25R2 from BASF), PEG-b-PPG-b-PEG (Pluronic L101 and L-92 from BASF), PPG (Pluronic P-4000), and PEG (Pluronic E-2000) many other example can be used in this invention to produce stable fluoropolymer dispersion.

Preferred embodiment of the invention use emulsifiers that contain segments of polyethylene glycol and/or polypropylene glycol and/or polytetramethylene glycol.

The emulsifier is generally used at a level of from 2 ppm to 2.5 percent, 100 ppm to 1 percent (10,000 ppm) and 100 ppm to 0.5 percent (5000 ppm), based on the total polymer solids of the fluoropolymer formed in the dispersion. In other embodiments of the invention very low levels of surfactant can used, below 0.01 weight percent, and preferably below 0.004 weight percent, based on the total monomer. Another embodiment of the invention is for no surfactant to be used anywhere in the polymerization process. In all cases the pressure of the reaction is greater than 800, preferably greater than 1000 psi, more preferable at least 1100 psi, more preferably at least 1200 psi. The pressure can be from greater than 1000 to about 2500 psi or preferably from at least 1100 to 2000 psi.

The process is free of fluorinated or partially fluorinated emulsifiers.

In the polymerization process, the emulsifier of this invention could be added all upfront prior to polymerization, fed continuously during the polymerization, fed partly before and then during polymerization, or fed after polymerization started and progressed for a while.

If the emulsifier in this invention is not fed until after polymerization is started, it can be fed after fluoromonomer conversion reaches at least 0.5%, more preferably of at least 1%, the conversion being defined as [(mass of polymer formed/mass of total polymer at completion)×100]. Preferably, the addition of emulsifier is started before the fluoropolymer conversion reaches 15%, more preferably before it reaches 10%.

Chain Transfer Agents

Chain-transfer agents are optionally added to the polymerization to regulate the molecular weight of the product. They may be added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Examples of chain transfer agents useful in the present invention include, but are not limited to oxygenated compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane.

Initiators

The reaction can be started and maintained by the addition of any suitable initiator known for the polymerization of fluorinated monomers including inorganic peroxides, "redox" combinations of oxidizing and reducing agents, organic peroxides and azo-type compounds. Examples of typical inorganic peroxides are the ammonium or alkali metal salts of persulfates. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate, metabisulfite, or ascorbic acid. Among the organic peroxides which can be used for the polymerization are the classes of alkyl peroxides, dialkyl peroxides, diacyl-peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonate, and di(n-propyl) peroxydicarbonate, diisopropyl peroxydicarbonate, di(sec-butyl) peroxydicarbonate, and di(2-ethylhexyl) peroxydicarbonate. Azo-type initiators include azobisisobutyronitrile (AIBN), 2,3-diethyl-2,3- dimethylsuccinonitrile, 2,3-diethyl-2,3-dimethylbutanedinitrile and the like.

Useful ionic initiators include, but are not limited to persulfate salts, such as ammonium persulfate, potassium persulfate, sodium persulfate; perphosphates, and permanganates. Other ionic initiators known in the art, including organic initiators with acid end groups such as ionic-group-containing organic peroxides are also contemplated for use in the invention, an example of which is succinic acid peroxide; or hydroxyl radical-generating initiators such as hydrogen peroxide would work in a similar fashion. As is commonly practiced in the art, these types of initiators can be used in conjunction with reducing agents in a 'redox' type initiation system in which a third catalytic component may also be added. Blends of ionizable inorganic peroxides with other inorganic or organic peroxides are contemplated as well. Potassium persulfate is an especially preferred initiator.

The quantity of an initiator required for a polymerization is related to its activity and the temperature used for the polymerization. The total amount of initiator used is generally between 0.002% to 2.5% by weight on the total monomer weight used. These compounds are added at a level sufficient to maintain a sufficient polymerization rate, typically from 100 ppm to 10,000 ppm versus total monomer, preferably from 200 ppm to 2,000 ppm, and most preferably from 200 ppm to 1,500 ppm. The initiator can be fed entirely to the initial feed, but is generally delay fed during the course of the reaction.

Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

Reaction Conditions

The polymerization of the fluorosurfactant-free fluoropolymer emulsion of the invention is conducted at an elevated pressure as compared to standard polymerization techniques. The pressure is greater than 800, preferably greater than 1000 psi, more preferable at least 1100 psi, more preferably at least 1200 psi. The pressure can be from greater than 800 to about 13000 psi or preferably from greater than 1000 to 2500 psi, even more preferably at least 1100 to 2000 psi. The polymerization of the fluoro surfactant-free fluoropolymer emulsion of the invention is conducted at a temperature of a typical fluoropolymer emulsion polymerization temperature. In the polymerization of vinylidene fluoride polymers and copolymers, the reaction temperature is between 25° C. and 145° C., preferably greater than 50° C., more preferably greater than 80° C. In a preferred embodiment, this reaction temperature is held constant (+/−1° C.) during the course of the polymerization. The solids level in the stable emulsion is at least 33.5 weight percent, preferably greater than 34 weight percent, preferably greater than 35 weight percent, preferably greater than 36 weight percent, more preferably greater than 37 weight percent.

The polymerization can be run in a batch mode, or preferably at least some of the monomer and initiator is in an initial, with a portion of the monomer and/or initiator delay fed over the course of the polymerization.

Other Additives

The fluoropolymer composition of the invention may also include typical additives, including, but not limited to, dyes; colorants; impact modifiers; antioxidants; flame-retardants; ultraviolet stabilizers; flow aids; conductive additives such as metals, carbon black and carbon nanotubes; defoamers; crosslinkers; waxes; solvents; plasticizers; and anti-static agents. Other additives that provide whitening could also be added to the fluoropolymer composition, including, but not limited to metal oxide fillers, such as zinc oxide; phosphate or phosphite stabilizers; and phenolic stabilizers.

Properties

Particle size of the produced emulsions is about the same or only slightly greater than the low pressure produced product. The general range of particle sizes observed was less than 350 nm and preferably less than 300 nm. Generally, the particle size is greater than 100 nm.

The solids level in the stable emulsion produced in the invention is at least 33.5 weight percent, preferably greater than 34 weight percent, preferably greater than 35 weight percent, preferably greater than 36 weight percent, more preferably greater than 37 weight percent. Weight percent solids of greater than 40 or greater weight percent are contemplated. A preferred solids range is at least 33.5 to 50 weight percent, of from greater than 34 to 45 weight percent solids, and more preferably from 35 to 45 weight percent, more preferably from 36 to 45 weight percent, more preferably from 37 to 45 weight percent.

The shelf-life of these latexes of the current invention are very good, retaining their fluidity and original viscosity after greater-than three months of storage with very little settling and no observable coagulum formation. In addition, the latexes are stable to typical fluid-transfer techniques including discharge into storage containers, pouring, agitation and mechanical pumping.

Latex viscosity is typically from 1.0 cP to 50 cP, preferably from 1.5 to 25 cP.

For purposes of this invention a YI of 20 or less is considered acceptable. A YI of greater than 20 is not acceptable. YI values of lower than 15 are preferred.

Uses

The fluorosurfactant-free fluoropolymer emulsions of the invention are useful in any applications that surfactant-containing fluoropolymer emulsions are useful. Due to the lower level of surfactant, fluoropolymers of the present invention are especially useful in applications involving heat aging, since the amount of surfactant has been decreases, as compared to polymerization run at lower pressure there is less surfactant to oxidize to produce coloration and applications where radiation is applied to the material to facilitate cross-linking.

EXAMPLES

Description of the Invention & Examples: High-Pressure FSF

Example 1: Latex Synthesis: 8717 g of deionized water, 6.54 g of PPO-PEO-PPO block copolymer (BASF Pluronic® 31R1), and 20.0 g of ethyl acetate were added to a reactor. The reactor was agitated, heated to 83 C and pressurized to 1250 psi with vinylidene fluoride. A feed of aqueous 2.0 wt % potassium persulfate ("KPS") with 2.0 wt % sodium acetate trihydrate ("SAT") was started at 650 g/hr. Upon start of pressure drop, KPS/SAT feed was reduced to 200 g/hr, Additional VDF was fed on-demand to maintain the 1250 psi reaction pressure. Feeds were continued in this fashion to maintain a range of 1000-3000 g/hr VDF uptake. All feeds were continued until a total of 6213 g of VDF had been fed to the reactor, including that used for pressurization. Monomer feed was stopped and the pressure was allowed to autogenously decrease for 10 minutes at which point the reactor was vented to atmospheric pressure and cooled to room temperature. Latex was discharged from the reactor and dried in a convection oven overnight. 14328.0 g of latex was recovered with solids of 33.5 wt %.

The same general procedure was used for runs 2-12 except with the changes as noted in Table 1. Data for additional runs is shown in Table 1. Runs were carried out as in Example 1, in the same reactor/agitator setup with modification of the reaction pressure and total targeted latex solids.

TABLE 1

Synthesis conditions and latex properties for example runs.

| Example | Pressure (psi) | Initiator Fed (ppm vs. total VDF) | Solids (%) | Particle Size (nm) | % Recovered in Rinse (coagulum) | Run Time (min) | Plaque YI (10 min @ 230 C.) |
|---|---|---|---|---|---|---|---|
| 1 | 1250 | 2235 | 33.5 | 219 | 0.7 | 131 | 17.4 |
| 2 Control | 650 | 2254 | 28.8 | 205 | 0.1 | 116 | 53.8 |
| 3 Control | 650 | 2465 | 33.2 | 224 | 0.1 | 126 | 21.1 |
| 4 Control | 650 | 2342 | 36.6 | 223 | 10.5 | 135 | 26.7 |
| 5 Control | 650 | 2421 | Targeted >37% | n/a - coagulated | 100.0 | Run stopped - coagulated | n/a |
| 6 Control | 1250 | 2139 | 27.1 | 195 | 0.1 | 90 | 23.4 |
| 7 control | 1250 | 2138 | 33.1 | 231.7 | 2.6 | 110 | 22.6 |
| 8 | 1250 | 1799 | 38.2 | 251 | 0.4 | 137 | 17.5 |
| 9 | 1250 | 1937 | 38.9 | 257 | 1.7 | 153 | 11.9 |
| 10 | 1250 | 549 | 37.7 | 243 | 3.2 | 228 | 7.9 |
| 11 | 1250 | 412 | 39.5 | 259 | 3.5 | 205 | 12.9 |
| 12 | 1250 | 838 | 38.8 | 239 | 2.7 | 200 | 6.6 |

Examples 2-5 represent low-pressure reaction controls and runs 9-12 are representative of the invention. Runs 6 and 7 represent lower solids.

Example run 1 shows the use of a higher pressure but at lower solids (lower than 34% solids). Control runs at lower pressure (650 psi) were conducted (Examples 3-5) where significant quantities of coagulum were observed for runs carried to greater than 33% solids with total coagulation occurring at ~36% solids. At higher pressure, coagulum quantity remained low (<5% of total product), even up to 39.0% solids latexes. (Examples 9-12). Above that concentration, full-coagulation of the latex to solid occurs. Of note is that all runs are in a 'typical' range of rate as evidenced by run time. Of course, this time is influenced by multiple factors including initiator total amount and feed schedule and total targeted latex solids, but one can readily observe that using the new process condition did not cause longer runs, which would be detrimental for productivity. 'Typical' reaction times of 1.5 to 3.5 hrs or so are maintained.

Dried material produced from the synthesis runs of Table 1 was melted and press it into four, ~2.5 in diameter by ~⅛ in thick discs, all of the same material, on the same press plate. A disc was removed following 10 min heating at 230 C.

YI (yellowness index) was measured for each disc using a Minolta colorimeter. (YI is a calculated value from the light absorbances measured by the instrument). Typical values are on a scale of −10 to about 30. Generally, anything more than YI=30 is 'brown', as it is saturating the instrument's detector, so numbers beyond 30 are meaningless. Less than YI=7 is considered very good, and is a 'clean-looking' white by eye. A lower value of YI is most desirable. For purposes of this invention a YI of 20 or less is considered acceptable.

When higher pressure runs were conducted, the YIs are markedly improved over the lower pressure runs.

What is claimed is:

1. A process for forming a stable fluoropolymer emulsion comprising a fluoropolymer, the process comprising polymerizing in a reactor, one or more fluoromonomers in an aqueous medium comprising initiator, surfactant, and running the polymerization at a pressure of greater than 800 psi; and wherein the surfactant comprises a non-fluorinated non-ionic emulsifiers containing segments of at least one of polyethylene glycol (PEG), polypropylene glycol (PPG), polytetramethylene glycol (PTMG) or a combination thereof, with repeating units between 2 to 200 and wherein the solids level in the stable emulsion produced is at least 33.5 weight percent of fluoropolymer solids.

2. The process of claim 1, wherein the pressure during polymerization is greater than 1000 psi.

3. The process of claim 1, wherein the pressure during polymerization is in range of from greater than 1000 psi to 2500 psi.

4. The process of claim 3, wherein the pressure during polymerization is in range of from at least 1100 psi to 2000 psi.

5. The process of claim 1, wherein the surfactant comprises at least one surfactant selected from the group consisting of polyethylene glycol acrylate (PEGA), polyethylene glycol methacrylate (PEG-MA), dimethyl polyethylene glycol (DMPEG), polyethylene glycol butyl ether (PEGBE), polyethylene glycol (PEG), polyethylene glycol phenol oxide (Triton X-100), polypropylene glycol acrylate (PPGA), polypropylene glycol (PPG) polypropylene glycol acrylate (PPGA), polypropylene glycol methacrylate (PPG-MA), and polytetramethylene glycol (PTMG).

6. The process of claim 1, wherein the surfactant comprises an emulsifier of Formula 1:

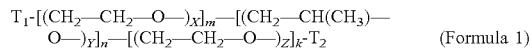

(Formula 1)

where X, Y, and Z are between 2 to 200; and m, n, k are from 0 to 5, wherein at least one of m, n and k are greater than 0 and $T_1$ and $T_2$ are terminal groups such as hydrogen, hydroxyl, carboxyl, ester, ether and/or hydrocarbon.

7. The process of claim 1, wherein the surfactant comprises a triblock copolymer having a PEG block and a PPG blocks.

8. The process of claim 1, wherein said non-fluorinated, non-ionic emulsifier(s) is present in the process at from 0 to 1 percent based on the weight of the fluoropolymer solids.

9. The process of claim 1, wherein no surfactant is added during the polymerization.

10. The process of claim 1, wherein the fluoromonomers are one or more fluoromonomers selected from the group consisting of vinylidene fluoride, tetrafluoroethylene, trifluoroethylene, chlorotrifluoroethylene, hexafluoropropene, vinyl fluoride, 1,1,1,3,3-pentafluoropropene, 1,1,1,3,3,3-hexafluoroisobutylene, 1,1,1,2-tetrafluoropropene, 1,1,1-trifluoropropene, 1,1,1,3-tetrafluoropropene, 1,1,1,2,3-pentafluoropropene, perfluoromethyl vinyl ether, perfluroethyl vinyl ether, and perfluoropropyl vinyl ether.

11. The process of claim 1, wherein said fluoropolymer contains at least 50 mole percent vinylidene fluoride monomer units.

12. The process of claim 1, wherein said fluoropolymer contains from 70 to 100 mole percent vinylidene fluoride monomer units and the level of one or more other fluoromonomers is from 0 to 30 mole percent.

13. The process of claim 1, further comprising from 200 ppm to 2,000 ppm of one or more ionic or ionizable initiators.

14. The process of claim 1, wherein said initiator(s) comprise at least one or more initiators selected from the group consisting of ammonium persulfate, alkali metal salts of persulfates, dialkyl peroxides, diacylperoxides, peroxyesters, and peroxydicarbonates.

15. The process of claim 1, wherein the surfactant is not added until after initiation of the polymerization reaction.

16. The process of claim 1, wherein at least part of the surfactant is added prior to initiation of the polymerization reaction.

17. The process of claim 1, wherein the fluoropolymer has a YI of 20 or less.

18. A polymer produced from the process of claim 1.

19. The polymer of claim 18, further comprising at least one additive selected from the group consisting of dyes, colorants, impact modifiers, antioxidants, flame-retardants, ultraviolet stabilizers, flow aids, conductive additives such as metals, carbon black and carbon nanotubes, defoamers, cross-linkers, waxes, solvents, plasticizers, and anti-static agents.

* * * * *